US011535741B2

(12) United States Patent
Hong et al.

(10) Patent No.: US 11,535,741 B2
(45) Date of Patent: Dec. 27, 2022

(54) BLOCK COPOLYMER COMPOSITION

(71) Applicant: LG Chem, Ltd., Seoul (KR)

(72) Inventors: Yoon Ki Hong, Daejeon (KR); Seok Pil Sa, Daejeon (KR); Hyun Mo Lee, Daejeon (KR); Eun Ji Shin, Daejeon (KR); Ki Soo Lee, Daejeon (KR); Bun Yeoul Lee, Gyeonggi-do (KR)

(73) Assignee: LG Chem, Ltd.

( * ) Notice: Subject to any disclaimer, the term of this patent is extended or adjusted under 35 U.S.C. 154(b) by 7 days.

(21) Appl. No.: 16/977,347

(22) PCT Filed: Mar. 29, 2019

(86) PCT No.: PCT/KR2019/003750
§ 371 (c)(1),
(2) Date: Sep. 1, 2020

(87) PCT Pub. No.: WO2019/190288
PCT Pub. Date: Oct. 3, 2019

(65) Prior Publication Data
US 2021/0108066 A1 Apr. 15, 2021

(30) Foreign Application Priority Data

Mar. 30, 2018 (KR) .................. 10-2018-0037549
Oct. 2, 2018 (KR) .................. 10-2018-0117838

(51) Int. Cl.
*C08F 297/04* (2006.01)
*C08L 53/00* (2006.01)
*C07F 3/06* (2006.01)
*C08F 293/00* (2006.01)
*C08F 4/44* (2006.01)
*C08F 10/14* (2006.01)
*C08F 297/02* (2006.01)
*C08L 25/06* (2006.01)
*C08L 25/08* (2006.01)
*C08F 210/14* (2006.01)
*C08F 212/08* (2006.01)

(52) U.S. Cl.
CPC ............ *C08L 53/00* (2013.01); *C07F 3/06* (2013.01); *C08F 4/44* (2013.01); *C08F 10/14* (2013.01); *C08F 210/14* (2013.01); *C08F 212/08* (2013.01); *C08F 293/00* (2013.01); *C08F 297/02* (2013.01); *C08L 25/06* (2013.01); *C08L 25/08* (2013.01); *C08L 2201/08* (2013.01)

(58) Field of Classification Search
CPC .... C08F 297/00; C08F 297/02; C08F 297/04; C08F 297/08; C08F 297/083; C08F 297/086
See application file for complete search history.

(56) References Cited

U.S. PATENT DOCUMENTS

| 3,649,579 A * | 3/1972 | Gorban et al. ......... C09J 153/00 524/505 |
| 5,618,883 A | 4/1997 | Plamthottam et al. |
| 2005/0222356 A1 | 10/2005 | Joly et al. |
| 2007/0078222 A1 | 4/2007 | Chang et al. |
| 2008/0008739 A1* | 1/2008 | Hossainy ................ A61L 31/10 424/426 |
| 2008/0153970 A1* | 6/2008 | Salazar ............... C08F 297/044 524/505 |
| 2008/0171828 A1* | 7/2008 | Bening ..................... C08F 8/00 524/577 |
| 2010/0197541 A1 | 8/2010 | Li et al. |
| 2012/0077400 A1 | 3/2012 | Flood et al. |
| 2012/0308752 A1 | 12/2012 | He et al. |
| 2013/0101767 A1* | 4/2013 | Wei ....................... C08G 81/022 428/35.7 |
| 2015/0030933 A1* | 1/2015 | Goetzen ............... C09D 153/00 429/231.95 |
| 2016/0101209 A1 | 4/2016 | Dubois |
| 2018/0022852 A1 | 1/2018 | Lee et al. |
| 2018/0030195 A1 | 2/2018 | Oshita et al. |
| 2018/0187040 A1* | 7/2018 | Wan ........................ C09D 5/002 |
| 2018/0355090 A1* | 12/2018 | Dubois ................. C08F 293/00 |
| 2020/0031978 A1 | 1/2020 | Lee et al. |
| 2021/0002303 A1 | 1/2021 | Sa et al. |
| 2021/0002473 A1 | 1/2021 | Lee et al. |

(Continued)

FOREIGN PATENT DOCUMENTS

| CN | 101802151 A | 8/2010 |
| CN | 102892828 A | 1/2013 |
| CN | 104115306 A | 10/2014 |

(Continued)

OTHER PUBLICATIONS

Scheirs et al. Modern Styrenic Polymers (Year: 2003).*
Wypych Handbook of Polymers (Year: 2012).*
Cao X Et Al: "Polyisobutylene Based Thermoplastic Elastomers: Vi. Pol Y(Alpha-Methylstyrene-Bisobutylene-B-Alpha-Methylstyrene) Triblock Copolymers By Coupling Of Living Poly (Alphamethylstyrene-B-Isobutylene) Diblock Copolymers", Polymer Bulletin, Springer, Heidelberg, De, vol. 45, No. 2, Sep. 1, 2000 (Sep. 1, 2000), pp. 121-128, Xp000977 404.
European Search Report for Application No. 19776148.9, dated Nov. 20, 2020, 7 pages.
European Search Report for Application No. 19778223.8, dated Nov. 20, 2020, 7 pages.
European Search Report for Application No. EP 19775609.1, dated Nov. 20, 2020, 7 pages.

(Continued)

Primary Examiner — Mark S Kaucher
(74) Attorney, Agent, or Firm — Lerner, David, Littenberg, Krumholz & Mentlik, LLP

(57) ABSTRACT

A block copolymer composition is disclosed herein. In some embodiments, a block copolymer composition has a weight average molecular weight ($M_w$) of 70,000 g/mol to 120,000 g/mol, a polydispersity index (PDI) of 1.0 to 2.0, a glass transition temperature ($T_g$) of −55° C. to −30° C., and a melt index (MI), measured at 230° C. and a loading condition of 5 kg, of 0.2 g/10 minutes to 3.0 g/10 minutes. The block copolymer composition has excellent processability.

18 Claims, No Drawings

(56) References Cited

U.S. PATENT DOCUMENTS

| | | |
|---|---|---|
| 2021/0017377 A1 | 1/2021 | Shin et al. |
| 2021/0108066 A1 | 4/2021 | Hong et al. |

FOREIGN PATENT DOCUMENTS

| | | | |
|---|---|---|---|
| EP | 1470190 A2 | 10/2004 | |
| EP | 2042531 A1 * | 4/2009 | .......... C08F 297/044 |
| EP | 3257880 A1 | 12/2017 | |
| EP | 3590983 A1 | 1/2020 | |
| JP | 2005516099 A | 6/2005 | |
| JP | 2020512470 A | 4/2020 | |
| KR | 20160098968 A | 8/2016 | |
| KR | 101732418 B1 | 5/2017 | |
| KR | 101829382 B1 | 2/2018 | |
| KR | 101848781 B1 | 4/2018 | |
| WO | 2016127353 A1 | 8/2016 | |
| WO | 2018182174 A1 | 10/2018 | |

OTHER PUBLICATIONS

European Search Report for Application No. EP 19776273.5, dated Nov. 20, 2020, 7 pages.

Chung et al., "A Novel Consecutive Chain Transfer Reaction to p-Methylstyrene and Hydrogen during Metallocene-Mediated Olefin Polymerization," Journal of the American Chemical Society, May 30, 2001, pp. 4871-4876, vol. 123, No. 21.

Dong et al., "Synthesis of Polyethylene Containing a Thermal p-Methylstyrene Group Metallocene-Mediated Ethylene Polymerization with a Consecutive Chain Transfer Reaction to p-Methylstyrene and Hydrogen," Macromolecules, Feb. 26, 2002, pp. 1622-1631, vol. 35, No. 5.

International Search Report for Application No. PCT/KR2019/003749 dated Jul. 10, 2019, 2 pages.

International Search Report for Application No. PCT/KR2019/003750 dated Jul. 10, 2019, 2 pages.

International Search Report for Application No. PCT/KR2019/003751 dated Jul. 10, 2019, 2 pages.

International Search Report for Application No. PCT/KR2019/003754 dated Jul. 10, 2019, 2 pages.

Kim et al., "Polystyrene Chain Growth from Di-End-Functional Polyolefins for Polystyrene-Polyolefin-Polystyrene Block Copolymers," Polymers, Oct. 2017, pp. 1-14, vol. 9, No. 481.

Kim et al., "Preparation of polystyrene-polyolefin multiblock copolymers by sequential coordination and anionic polymerization," RSC Advances, Jan. 9, 2017, pp. 5948-5956, vol. 7, No. 10.

Ning et al., "Synthesis of Amphiphilic Block-Graft Copolymers [Poly(styrene-b-ethylene-co-butylene-b-styrene)-g-Poly(acrylic acid)] and Their Aggregation in Water," Journal of Polymer Science Part A: Polymer Chemistry. May 1, 2002, pp. 1253-1266, vol. 40, No. 9.

Peinado, et al., "Effects of ozone in surface modification and thermal stabiity of SEBS block copolymers," Polymer Degradation and Stability, Jun. 1, 2010, pp. 975-986, vol. 95, No. 6.

Rabagliati, et al., "Styrene/(Styrene Derivative) and Styrene/(1-Alkene) Copolymerization Using Ph2Zn-Additive Initiator Systems," Macromol. Symp., Sep. 2004, pp. 55-64, vol. 216, No. 1.

Weiser et al., "Formation of Polyolefin-block-polystyrene Block Copolymers on Phenoxyimine Catalystsa," Molecular Rapid Communications, Jul. 5, 2006, pp. 1009-1014, vol. 27, No. 13.

Indian Examination Report for Application No. 202017042499 dated Jan. 19, 2022, 2 pages.

* cited by examiner

BLOCK COPOLYMER COMPOSITION

CROSS-REFERENCE TO RELATED APPLICATIONS

The present application is a national phase entry under 35 U.S.C. § 371 of International Application No. PCT/KR2019/003750, filed on Mar. 29, 2019, which claims priority from Korean Patent Application Nos. 10-2018-0037549 and 10-2018-0117838, filed Mar. 30, 2018 and Oct. 2, 2018, respectively, the disclosures of which are incorporated by reference herein.

TECHNICAL FIELD

The present invention relates a block copolymer composition, and more particularly, to a block copolymer composition including a diblock copolymer and a triblock copolymer which include a polyolefin-based block and a polystyrene-based block.

BACKGROUND ART

In recent years, polyolefin-polystyrene block copolymers, for example, styrene-ethylene/butylene-styrene (SEBS) or styrene-ethylene/propylene-styrene (SEPS), have formed a global market of several hundred thousand tons. Also, they have an advantage in that they have superior heat resistance and light fastness compared to styrene-butadiene-styrene (SBS) or styrene-isoprene-styrene (SIS), and have been used in materials for a grip or steering wheel that is tough but soft to the touch, elastic materials for diapers, oil gels used in medical and communication materials, impact modifiers for engineering plastics, flexibilizers or tougheners for transparent polypropylene, and the like. Conventional SEBS is prepared by a 2-step reaction of anionically polymerizing styrene and butadiene and subjecting the resulting SBS to a hydrogenation reaction. Likewise, conventional SEPS is also prepared by a 2-step reaction of anionically polymerizing styrene and isoprene and subjecting the resulting SIS to a hydrogenation reaction. As such, a process of saturating all the double bonds included in the polymer main chain by hydrogenating the same has a drawback in that the unit cost of SEBS and SEPS is considerably higher than SBS and SIS prior to the hydrogenation reaction due to high processing costs. This point acts as a limit on market expansion. Also, because it is in fact impossible to saturate all the double bonds in the polymer chain by means of the hydrogenation reaction, the commercialized SEBS and SEPS include a few residual double bonds, and the presence of the residual double bonds often becomes an issue (Journal of Polymer Science: Part A: Polymer Chemistry, 2002, 40, 1253; Polymer Degradation and Stability 2010, 95, 975). Also, the conventional block copolymer thus prepared through the two steps has a very limited structure because a polyolefin block is formed by means of a hydrogenation reaction after the anionic polymerization of butadiene or isoprene.

Under this background, the preparation of a polyolefin-polystyrene block copolymer directly from an olefin monomer and a styrene monomer using a one-pot reaction is a challenging subject of research having very high commercial ramifications. In this regard, it was reported in the prior art that, after polypropylene having a para-methylstyryl group at a terminal is synthesized using para-methylstyrene as a molecular weight control agent during polymerization of polypropylene, a polypropylene-polystyrene block copolymer is prepared by inducing a dehydrogenation reaction of a methyl group of the terminal with butyl lithium, followed by styrenically anionic polymerization (J. Am. Chem. Soc. 2001, 123, 4871; Macromolecules 2002, 35, 1622). As another example, an attempt utilizing the living polymerization reactivity of a phenoxyimine catalyst to perform an ethylene/propylene copolymerization, followed by injecting a styrene monomer to prepare a block copolymer (Marcomole. Rapid. Commun., 2006, 27, 1009) was reported. However, the methods reported in the prior art as described above are not applied to commercial processes because they require a multi-step process, and the like.

DISCLOSURE

Technical Problem

The present invention is designed to solve the problems of the prior art, and therefore it is an object of the present invention to provide a block copolymer composition having improved melt processability, and more particularly a block copolymer composition including a diblock copolymer and a triblock copolymer which include a polyolefin-based block and a polystyrene-based block.

Technical Solution

To achieve the above object, according to one aspect of the present invention, there is provided a block copolymer composition having: (1) a weight average molecular weight ($M_w$) of 70,000 g/mol to 120,000 g/mol; (2) a polydispersity index (PDI) of 1.0 to 2.0; (3) a glass transition temperature ($T_g$) of −55° C. to −30° C.; and (4) a melt index (MI, measured at 230° C. and a condition of loading of 5 kg) of 0.2 to 3.0 g/10 minutes.

Advantageous Effects

A block copolymer composition according to the present invention more particularly includes a diblock copolymer and a triblock copolymer which include a polyolefin-based block and a polystyrene-based block, and the structures and characteristics of each of the blocks of such block copolymers can be regulated and a content of the triblock copolymer in the composition can be maximized so that the block copolymer composition can satisfy certain property conditions at the same time, thereby satisfying excellent melt processability.

BEST MODE FOR CARRYING OUT THE INVENTION

Hereinafter, the present invention will be described in further detail to aid in understanding the present invention.

Therefore, it should be understood that the terms or words used in the specification and appended claims should not be construed as limited to general or dictionary meanings, but interpreted based on the meanings and concepts corresponding to technical aspects of the present invention on the basis of the principle that the inventor is allowed to define terms appropriately for the best explanation.

The term "composition" used in this specification is intended to encompass reaction products and decomposition products formed from materials of the corresponding composition as well as a mixture of the materials including the corresponding composition.

The term "residual unsaturated bond" used in this specification refers to an unsaturated bond such as a double bond, a triple bond, or the like, which is present in the polymer chain of a block copolymer included in a block copolymer composition. In this case, the polymer chain includes the main chain and side chains of the block copolymer, and includes unsaturated bonds generated in a polymerization process as well as unsaturated bonds included in source materials (such as monomers, polymers, initiators, catalysts, and the like) used to prepare the block copolymer or derived from the source materials.

Unless otherwise defined, the term "halogen" used in this specification refers to fluorine, chlorine, bromine, or iodine.

Unless otherwise defined, the term "alkyl" used in this specification refers to a linear, cyclic or branched hydrocarbon residue.

Unless otherwise defined, the term "aryl" used in this specification refers to an aromatic group including phenyl, naphthyl, anthryl, phenanthryl, chrysenyl, pyrenyl, and the like.

In this specification, the silyl may be silyl unsubstituted or substituted with an alkyl having 1 to 20 carbon atoms, for example, silyl, trimethylsilyl, or triethylsilyl.

A block copolymer composition of the present invention satisfies the following property conditions: (1) a weight average molecular weight ($M_w$) of 70,000 g/mol to 120,000 g/mol; (2) a polydispersity index (PDI) of 1.0 to 2.0; (3) a glass transition temperature ($T_g$) of −55° C. to −30° C.; and (4) a melt index (MI, measured at 230° C. and a condition of loading of 5 kg) of 0.2 to 3.0 g/10 minutes, and may satisfy excellent melt processability by satisfying the property conditions at the same time.

The block copolymer composition of the present invention may satisfy the conditions (1) to (4) at the same time, and thus may have a high molecular weight and a wide molecular weight distribution and may exhibit excellent heat resistance and fluidity, thereby exhibiting excellent processability, particularly excellent melt processability.

The block copolymer composition may satisfy (1) a weight average molecular weight ($M_w$) of 70,000 g/mol to 120,000 g/mol, particularly 72,000 g/mol to 110,000 g/mol, and more particularly 74,000 g/mol to 103,000 g/mol. In the present invention, the weight average molecular weight ($M_w$) means a molecular weight converted from that of a polystyrene standard as analyzed using gel permeation chromatography (GPC).

Also, the block copolymer composition may satisfy (2) a polydispersity index (PDI) of 1.0 to 2.0, particularly 1.2 to 1.8, and more particularly 1.4 to 1.7. In the present invention, the polydispersity index means an $M_w/M_n$ ratio, where $M_w$ represents a weight average molecular weight, and $M_n$ represents a number average molecular weight.

Also, the block copolymer composition may satisfy (3) a glass transition temperature ($T_g$) of −55° C. to −30° C., particularly −55° C. to −39° C., and more particularly −52° C. to −39° C. The glass transition temperature ($T_g$) may be measured using a dynamic mechanical analyzer (DMA).

In addition, the block copolymer composition may satisfy (4) a melt index (MI, measured at 230° C. and a condition of loading of 5 kg) of 0.2 to 3.0 g/10 minutes, particularly 0.3 to 2.5 g/10 minutes, and more particularly 0.3 to 2.1 g/10 minutes.

The melt index (MI) may have an influence on mechanical properties, impact strength, and moldability of the block copolymer. In this specification, the melt index may be measured at 230° C. and a condition of loading of 5 kg according to the ASTM D1238 (ISO 1133) standards.

The block copolymer composition includes a diblock copolymer including a polyolefin-based block and a poly-styrene-based block; and a triblock copolymer including a polyolefin-based block and a polystyrene-based block, and may, for example, be prepared by a preparation method, which includes (1) allowing an organozinc compound to react with one or more olefin-based monomers in the presence of a transition metal catalyst to form an olefin-based polymer block, thereby preparing an intermediate; and (2) allowing the intermediate obtained in the step (1) to react with a styrene-based monomer in the presence of an alkyllithium compound to form a styrene-based polymer block.

(1) Step of allowing organozinc compound to react with one or more olefin-based monomers in presence of transition metal catalyst to form olefin-based polymer block, thereby preparing intermediate In the step (1), the olefin-based monomer may be inserted between A and Zn of the organozinc compound and polymerized to form an olefin-based polymer block.

According to one embodiment of the present invention, the olefin-based polymer block formed by polymerization of the one or more olefin-based monomers may include a repeating unit represented by the following Formula 1. In this specification, the olefin-based polymer block including the repeating unit represented by the following Formula 1 is referred to as a first block.

In the step (1), the olefin-based monomer may form a first block including one or more repeating units represented by the following Formula 1:

[Formula 1]

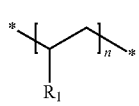

In Formula 1, wherein $R_1$ is hydrogen; an alkyl having 1 to 20 carbon atoms; an alkyl having 1 to 20 carbon atoms, which is substituted with silyl; an arylalkyl having 7 to 20 carbon atoms; or an arylalkyl having 7 to 20 carbon atoms, which is substituted with silyl, and n may be an integer ranging from 10 to 10,000.

Also, according to one embodiment of the present invention, $R_1$ may be hydrogen; or an alkyl having 3 to 20 carbon atoms.

In addition, according to one embodiment of the present invention, $R_1$ may be hydrogen; or an alkyl having 3 to 12 carbon atoms. Particularly, $R_1$ may be hydrogen or an alkyl having 4 to 12 carbon atoms.

Further, n may be an integer ranging from 10 to 10,000, and particularly an integer ranging from 500 to 7,000.

Meanwhile, in the formulas represented in the specification of the present invention, the symbol "*" represents a terminus of a repeating unit serving as a binding site.

According to one embodiment of the present invention, when the first block includes two or more repeating units represented by Formula 1, the first block may include a repeating unit represented by the following Formula 2:

[Formula 2]

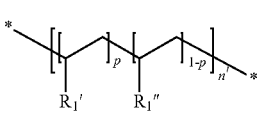

In Formula 2, wherein $R_1{'}$ and $R_1{''}$ are each independently hydrogen; an alkyl having 1 to 20 carbon atoms; an alkyl having 1 to 20 carbon atoms, which is substituted with silyl; an arylalkyl having 7 to 20 carbon atoms; or an arylalkyl having 7 to 20 carbon atoms, which is substituted with silyl, provided that $R_1'$ and $R_1''$ are different from each other, 0<p<1, and n' may be an integer ranging from 10 to 10,000.

Also, according to one embodiment of the present invention, $R_1'$ and $R_1''$ may be each independently hydrogen or an alkyl having 3 to 20 carbon atoms, particularly each independently hydrogen or an alkyl having 3 to 12 carbon atoms, and more particularly each independently hydrogen or an alkyl having 4 to 12 carbon atoms.

In addition, n' may be particularly an integer ranging from 10 to 10,000, and may be more particularly an integer ranging from 500 to 7,000.

According to one embodiment of the present invention, any one of $R_1'$ and $R_1''$ in Formula 2 may be hydrogen, and the other may be a substituent other than hydrogen among the aforementioned substituents.

That is, according to one embodiment of the present invention, when the first block includes two or more repeating units represented by Formula 1, the first block may include the repeating units in which a structure in which $R_1$ is hydrogen is randomly connected to a structure in which $R_1$ is not hydrogen but an alkyl having 1 to 20 carbon atoms; an alkyl having 1 to 20 carbon atoms, which is substituted with silyl; an arylalkyl having 7 to 20 carbon atoms; or an arylalkyl having 7 to 20 carbon atoms, which is substituted with silyl. Particularly, the first block may include the repeating units in which a structure in which $R_1$ is hydrogen is randomly connected to a structure in which $R_1$ is not hydrogen but an alkyl having 3 to 20 carbon atoms.

Also, more particularly, the first block may be configured so that a structure in which $R_1$ in Formula 1 is hydrogen is randomly connected to a structure in which $R_1$ is an alkyl having 3 to 12 carbon atoms. Further particularly, the first block may be configured so that a structure in which $R_1$ in Formula 1 is hydrogen is randomly connected to a structure in which $R_1$ is an alkyl having 4 to 12 carbon atoms.

When the first block includes two or more repeating units represented by Formula 1, the first block may include a structure in which $R_1$ in Formula 1 is hydrogen and a structure in which $R_1$ is a substituent other than hydrogen at a weight ratio of 30:90 to 70:10, particularly a weight ratio of 40:60 to 60:40, and more particularly a weight ratio of 45:75 to 55:25.

When the first block includes the structure in which $R_1$ in Formula 1 is hydrogen and the structure in which $R_1$ is a substituent other than hydrogen in this weight ratio range, the prepared block copolymer includes a proper level of branches in the structure. Therefore, the block copolymer may have high values for modulus at 300% strain and elongation at break, thereby exhibiting excellent elastic characteristics. Also, the block copolymer may have a high molecular weight and wide molecular weight distribution as well, thereby exhibiting excellent processability.

According to one embodiment of the present invention, the olefin-based monomer, which is inserted between Zn and A of the organozinc compound and polymerized to form the olefin-based polymer block (a first block), may include ethylene and one or more alpha-olefin-based monomers at the same time, and particularly may include ethylene and one or more alpha-olefin-based monomers which are not ethylene.

According to one embodiment of the present invention, the alpha-olefin-based monomer may be particularly an aliphatic olefin having 3 to 20 carbon atoms, more particularly an aliphatic olefin having 4 to 12 carbon atoms, and further particularly an aliphatic olefin having 5 to 12 carbon atoms. The aliphatic olefin may, for example, include propylene, 1-butene, 1-pentene, 3-methyl-1-butene, 1-hexene, 4-methyl-1-pentene, 3-methyl-1-pentene, 1-heptene, 1-octene, 1-decene, 1-undecene, 1-dodecene, 1-tetradecene, 1-hexadecene, 1-eicosene, 4,4-dimethyl-1-pentene, 4,4-diethyl-1-hexene or 3,4-dimethyl-1-hexene, and the like. In this case, the aliphatic olefin may be any one, or a mixture of two or more, of the aforementioned components.

According to one embodiment of the present invention, the organozinc compound may be a compound represented by the following Formula 3:

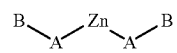

[Formula 3]

In Formula 3, wherein A is an alkylene having 1 to 20 carbon atoms; an arylene having 6 to 20 carbon atoms; or an arylene having 6 to 20 carbon atoms, which is substituted with a halogen, an alkyl having 1 to 12 carbon atoms, a cycloalkyl having 3 to 12 carbon atoms, an alkoxy having 1 to 8 carbon atoms, or an aryl having 6 to 12 carbon atoms, and B is an arylene having 6 to 12 carbon atoms, which is substituted with an alkenyl having 2 to 12 carbon atoms.

Also, A may be an alkylene having 1 to 12 carbon atoms; an arylene having 6 to 12 carbon atoms; or an arylene having 6 to 12 carbon atoms, which is substituted with a halogen, an alkyl having 1 to 12 carbon atoms, a cycloalkyl having 3 to 12 carbon atoms, an alkoxy having 1 to 8 carbon atoms, or an aryl having 6 to 12 carbon atoms, and B may be an arylene having 6 to 12 carbon atoms, which is substituted with an alkenyl having 2 to 8 carbon atoms.

Formula 3 may have a structure in which a double bond is provided to both termini thereof. For example, when B is an arylene substituted with an alkenyl, the arylene may be connected to A, and the double bond of the alkenyl substituted in the arylene may be positioned in the outermost part in Formula 3.

When the organozinc compound is allowed to react with one or more olefin-based monomers for forming the first block in the presence of the transition metal catalyst for olefin polymerization as described above, the olefin-based monomer may be polymerized while being inserted between the zinc (Zn) and organic group (A) of the organozinc compound to prepare an intermediate in which an olefin-based polymer block (a first block) is formed. One example of the intermediate thus formed is represented by the following Formula 4:

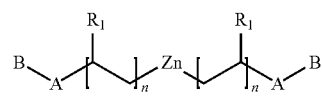

[Formula 4]

In Formula 4, wherein $R_1$ is hydrogen; an alkyl having 1 to 20 carbon atoms; an alkyl having 1 to 20 carbon atoms, which is substituted with silyl; an arylalkyl having 7 to 20 carbon atoms; or an arylalkyl having 7 to 20 carbon atoms, which is substituted with silyl, A is an alkylene having 1 to 20 carbon atoms; an arylene having 6 to 20 carbon atoms; or an arylene having 6 to 20 carbon atoms, which is substituted with a halogen, an alkyl having 1 to 12 carbon atoms, a cycloalkyl having 3 to 12 carbon atoms, an alkoxy having 1 to 8 carbon atoms, or an aryl having 6 to 12 carbon atoms, B is an arylene having 6 to 12 carbon atoms, which is substituted with an alkenyl having 2 to 12 carbon atoms, and n is an integer ranging from 10 to 10,000.

Also, each of $R_1$ and n is as defined in Formula 1, and each of A and B is as defined in Formula 3.

According to one embodiment of the present invention, when the organozinc compound is allowed to react with two or more olefin-based monomers for forming the first block in the presence of the transition metal catalyst for olefin polymerization as described above, one example of the formed intermediate may be represented by the following Formula 5:

[Formula 5]

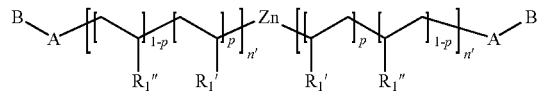

In Formula 5, wherein each of $R_1'$, $R_1''$, p, and n' is as defined in Formula 2, each of A and B is as defined in Formula 3.

(2) Step of allowing intermediate obtained in step (1) to react with styrene-based monomer in presence of alkyllithium compound to form styrene-based polymer block In the step (2), the styrene-based monomer may be inserted between Zn and the olefin-based polymer block of the intermediate and polymerized to form a styrene-based polymer block.

The alkyllithium may be an alkyllithium compound containing a silicon atom, and may, for example, be $Me_3SiCH_2Li$.

According to one embodiment of the present invention, the styrene-based polymer block formed by polymerization of the styrene-based monomer may include a repeating unit represented by the following Formula 6. In this specification, the styrene-based polymer block including the repeating unit represented by the following Formula 6 is referred to as a second block:

[Formula 6]

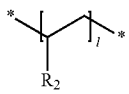

In Formula 6, wherein $R_2$ is an aryl having 6 to 20 carbon atoms; or an aryl having 6 to 20 carbon atoms, which is substituted with a halogen, an alkyl having 1 to 12 carbon atoms, a cycloalkyl having 3 to 12 carbon atoms, an alkoxy having 1 to 8 carbon atoms, or an aryl having 6 to 12 carbon atoms, and l is an integer ranging from 10 to 1,000.

According to one embodiment of the present invention, $R_2$ may be phenyl; or phenyl unsubstituted or substituted with a halogen, an alkyl having 1 to 8 carbon atoms, a cycloalkyl having 3 to 12 carbon atoms, an alkoxy having 1 to 8 carbon atoms, or an aryl having 6 to 12 carbon atoms. Also, $R_2$ may be phenyl.

l may be an integer ranging from 10 to 1,000, and particularly an integer ranging from 50 to 700. In this case, when l falls within this range, the polyolefin-polystyrene block copolymer prepared by the preparation method of the present invention may have a proper level of viscosity.

In the step (2), when the styrene-based monomer is inserted between Zn and the olefin-based polymer block of the intermediate and polymerized to form a styrene-based polymer block (a second block), the first block including the repeating unit represented by Formula 1 and the second block including the repeating unit represented by Formula 6 may be bound to form a composite block represented by Formula 7.

[Formula 7]

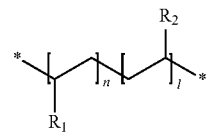

In Formula 7, wherein $R_1$ is hydrogen; an alkyl having 1 to 20 carbon atoms; an alkyl having 1 to 20 carbon atoms, which is substituted with silyl; an arylalkyl having 7 to 20 carbon atoms; or an arylalkyl having 7 to 20 carbon atoms, which is substituted with silyl, $R_2$ is an aryl having 6 to 20 carbon atoms; or an aryl having 6 to 20 carbon atoms, which is substituted with a halogen, an alkyl having 1 to 12 carbon atoms, a cycloalkyl having 3 to 12 carbon atoms, an alkoxy having 1 to 8 carbon atoms, or an aryl having 6 to 12 carbon atoms, l is an integer ranging from 10 to 1,000, and n is an integer ranging from 10 to 10,000.

Also, in Formula 7, each of $R_1$, $R_2$, l, and n is as defined in Formulas 1 and 6.

Also, when the first block includes the repeating unit represented by Formula 2, the composite block formed by binding of the second block, which includes the repeating unit represented by Formula 6, to the first block may be represented by the following Formula 8:

[Formula 8]

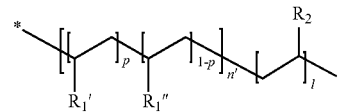

wherein each of $R_1'$, $R_1''$, p, l, and n' is as defined in Formula 2 or 6.

According to one embodiment of the present invention, in the step (2), the styrene-based monomer may be inserted between the Zn and olefin-based polymer block of the intermediate and polymerized to form a styrene-based polymer block (a second block). At the same time, the styrene-based monomer may be bound to a site in the organozinc compound, which is represented as B in Formula 4, and polymerized to form a separate styrene-based polymer block. In this specification, the separate styrene-based polymer block bound to the site represented as B and polymerized is referred to as a third block.

According to one embodiment of the present invention, as the second block and the third block are simultaneously formed in the step (2), a triblock copolymer may be formed.

The third block may include a repeating unit represented by the following Formula 9:

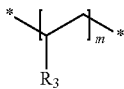
[Formula 9]

In Formula 9,
wherein $R_3$ is an aryl having 6 to 20 carbon atoms; or an aryl having 6 to 20 carbon atoms, which is substituted with a halogen, an alkyl having 1 to 12 carbon atoms, a cycloalkyl having 3 to 12 carbon atoms, an alkoxy having 1 to 8 carbon atoms, or an aryl having 6 to 12 carbon atoms, and
m is an integer ranging from 10 to 1,000.

Also, according to one embodiment of the present invention, $R_3$ may be phenyl; or phenyl unsubstituted or substituted with a halogen, an alkyl having 1 to 8 carbon atoms, a cycloalkyl having 3 to 12 carbon atoms, an alkoxy having 1 to 8 carbon atoms, or an aryl having 6 to 12 carbon atoms. Also, $R_3$ may be phenyl.

m may be an integer ranging from 10 to 1,000, and particularly an integer ranging from 50 to 700.

That is, according to one embodiment of the present invention, in the step (2), the styrene-based monomer may separately form a second block including the repeating unit represented by Formula 6, and a third block including the repeating unit represented by Formula 9.

Therefore, the block copolymer composition may include a triblock copolymer, which includes a first block including one or more repeating units represented by the following Formula 1; a second block including a repeating unit represented by the following Formula 6; and a third block including a repeating unit represented by the following Formula 9.

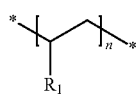
[Formula 1]

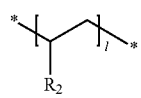
[Formula 6]

-continued

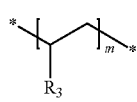
[Formula 9]

In Formula,
wherein $R_1$ is hydrogen; an alkyl having 1 to 20 carbon atoms; an alkyl having 1 to 20 carbon atoms, which is substituted with silyl; an arylalkyl having 7 to 20 carbon atoms; or an arylalkyl having 7 to 20 carbon atoms, which is substituted with silyl, $R_2$ and $R_3$ are each independently an aryl having 6 to 20 carbon atoms; or an aryl having 6 to 20 carbon atoms, which is substituted with a halogen, an alkyl having 1 to 12 carbon atoms, a cycloalkyl having 3 to 12 carbon atoms, an alkoxy having 1 to 8 carbon atoms, or an aryl having 6 to 12 carbon atoms, n is an integer ranging from 10 to 10,000, and l and m are each independently an integer ranging from 10 to 1,000.

Also, in the formulas, each of $R_1$, $R_2$, $R_3$, n, l, and m is as defined in Formulas 1, 6 and 9.

According to one embodiment of the present invention, because the first block, the second block, and the third block are formed symmetrically about the zinc (Zn) of the organozinc compound represented by Formula 3 as the center of symmetry, a compound in which triblock copolymers including three blocks are formed symmetrically about the zinc may be prepared in the step (2). One example of such a block copolymer is represented by the following Formula 10:

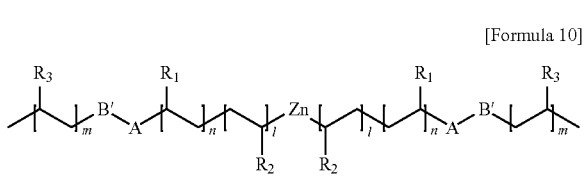
[Formula 10]

In Formula 10,
wherein each of $R_1$ to $R_3$, l, m, and n is as defined in Formulas 1, 5, and 7, A is as defined in Formula 3, and B' represents a state in which B defined in Formula 3 is bound to the repeating unit of Formula 9.

Also, when the first block includes the repeating unit represented by Formula 2, one example of the compound prepared in the step (2) in which the triblock copolymers including three blocks are formed symmetrically about the zinc of the organozinc compound may be represented by the following Formula 11:

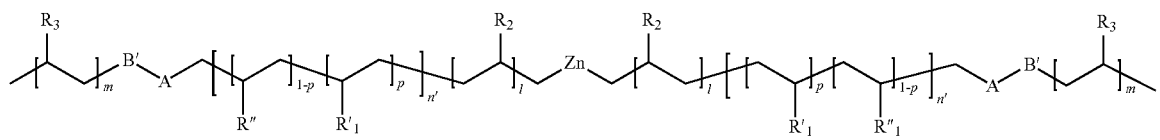
[Formula 11]

In Formula 11,
wherein each of $R_1'$, $R_1''$, $R_2$ and $R_3$, p, l, m, and n' is as defined in Formulas 2, 5 and 7, A is as defined in Formula 3, and B' represents a state in which B defined in Formula 3 is bound to the repeating unit of Formula 9.

According to one embodiment of the present invention, when two or more of the first and second blocks are included, the first block and the second block may be included such that the repeating unit is the composite block having the structure represented by Formula 7 or 8. For example, in description of an exemplary case in which the block copolymer includes two first blocks, two second blocks, and one third block, it is meant that the block copolymer includes two composite blocks and one third block.

Also, according to one embodiment of the present invention, when the block copolymer includes two or more composite blocks of Formula 7, the composite blocks, except for one thereamong, may be connected to another composite block and not to the third block. For example, when the block copolymer includes two or more composite blocks, one of the composite blocks may be connected to the third block, and the block copolymer may be further extended via bonds between the composite blocks to have a structure such as "third block-composite block-composite block- . . . ".

Also, when two composite blocks are connected, they may be connected in such a manner that the first and second blocks included in the separate composite blocks are connected. For example, when the block copolymer according to one embodiment of the present invention includes one third block and two composite blocks, the structure may have a structure such as "third block-first block-second block-first block-second block-".

As such, the block copolymer composition according to one embodiment of the present invention may include a block copolymer having a structure represented by the following Formula 12:

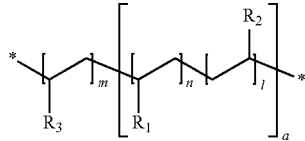

[Formula 12]

In Formula 12, wherein $R_1$ is hydrogen; an alkyl having 1 to 20 carbon atoms; an alkyl having 1 to 20 carbon atoms, which is substituted with silyl; an arylalkyl having 7 to 20 carbon atoms; or an arylalkyl having 7 to 20 carbon atoms, which is substituted with silyl, $R_2$ and $R_3$ are each independently an aryl having 6 to 20 carbon atoms; or an aryl having 6 to 20 carbon atoms, which is substituted with a halogen, an alkyl having 1 to 12 carbon atoms, a cycloalkyl having 3 to 12 carbon atoms, an alkoxy having 1 to 8 carbon atoms, or an aryl having 6 to 12 carbon atoms, l and m are each independently an integer ranging from 10 to 1,000, and n is an integer ranging from 10 to 10,000.

Also, in Formula 12, a may be an integer ranging from 1 to 50, particularly an integer ranging from 1 to 20, and more particularly an integer ranging from 1 to 10.

In addition, in Formula 12, each of $R_1$ to $R_3$, l, m, and n is as defined in Formulas 1, 6 and 9.

Further, the block copolymer composition according to one embodiment of the present invention may include a block copolymer having a structure represented by the following Formula 13:

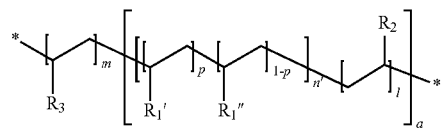

[Formula 13]

In Formula 13, wherein $R_1'$ and $R_1''$ are each independently hydrogen; an alkyl having 1 to 20 carbon atoms; an alkyl having 1 to 20 carbon atoms, which is substituted with silyl; an arylalkyl having 7 to 20 carbon atoms; or an arylalkyl having 7 to 20 carbon atoms, which is substituted with silyl, provided that $R_1'$ and $R_1''$ are different from each other, $0<p<1$, $R_2$ and $R_3$ are each independently an aryl having 6 to 20 carbon atoms; or an aryl having 6 to 20 carbon atoms, which is substituted with a halogen, an alkyl having 1 to 12 carbon atoms, a cycloalkyl having 3 to 12 carbon atoms, an alkoxy having 1 to 8 carbon atoms, or an aryl having 6 to 12 carbon atoms, l and m are each independently an integer ranging from 10 to 1,000, and n is an integer ranging from 10 to 10,000.

Also, in Formula 13, a may be an integer ranging from 1 to 50, particularly an integer ranging from 1 to 20, and more particularly an integer ranging from 1 to 10.

In addition, in Formula 13, each of $R_1'$, $R_1''$, $R_2$ and $R_3$, p, l, m, and n' is as defined in Formulas 2, 6, and 9.

According to one embodiment of the present invention, the styrene-based monomer may be for example, a styrene-based monomer unsubstituted or substituted with a halogen, an alkyl having 1 to 8 carbon atoms, a cycloalkyl having 3 to 12 carbon atoms, an alkoxy having 1 to 8 carbon atoms, or an aryl having 6 to 12 carbon atoms.

As described above, as the second block and the third block are simultaneously formed in the step (2), a triblock copolymer may be formed. In the step (2), when one of the second block and the third block is not formed, a diblock copolymer is formed.

The block copolymer composition of the present invention may include a diblock copolymer including a polyolefin-based block and a polystyrene-based block; and a triblock copolymer including a polyolefin-based block and a polystyrene-based block. In this case, a content of the diblock copolymer may be less than or equal to 19% by weight. When the content of the diblock copolymer satisfies 19% by weight or less, the block copolymer composition may have excellent thermal stability, chemical durability, and mechanical properties, and may also exhibit excellent melt processability.

The diblock copolymer may be a polyolefin-polystyrene diblock copolymer, and the triblock copolymer may be a polystyrene-polyolefin-polystyrene triblock copolymer. In this case, the contents of the diblock copolymer and the triblock copolymer are affected by the ratio of the number of moles of the organozinc compound used in the step (1) and the number of moles of the alkyllithium used in the step (2).

In one example of the method of preparing a block copolymer composition according to the present invention, the number of moles of the alkyllithium used in the step (2) may be higher than the number of moles of the organozinc compound used in the step (1). That is, an amount of lithium (Li) may be used at an amount higher than that of zinc (Zn) during preparation of the block copolymer composition according to the present invention. When the number of moles of the alkyllithium used in the step (2) is higher than the number of moles of the organozinc compound used in the step (1), productivity may be improved due to an increased polymerization rate, and both the zinc (Zn) and olefinic polymer ends are initiated to effectively synthesize a triblock copolymer. Meanwhile, the number of moles of the alkyllithium used in the step (2) is not particularly limited as long as the number of moles of the alkyllithium is higher than the number of moles of the organozinc compound used in the step (1). However, a ratio of the number of moles of the organozinc compound used in the step (1) and the number of moles of the alkyllithium used in the step (2) may be in a range of 1:1.05 to 1:4, particularly 1:1 to 1:3, and more particularly 1:1.1 to 1:2.5.

In the method of preparing a block copolymer composition according to one embodiment of the present invention, when an amount of the lithium (Li) is used at an amount higher than that of zinc (Zn), a reaction at both the zinc (Zn) and ends of the olefin-based polymer may be initiated to effectively synthesize a triblock copolymer, thereby minimizing a content of the diblock copolymer. In this case, the block copolymer composition of the present invention may include the diblock copolymer at an amount of 19% by weight or less, particularly 18% by weight or less, and more particularly 17% by weight or less, based on the total weight of the copolymer composition. Because the mechanical properties of the copolymer composition may be degraded with an increasing content of the diblock copolymer, the smaller the content of diblock copolymer the better. However, the lower limit of the content of the diblock copolymer may be 0.1% by weight. According to one embodiment of the present invention, the polyolefin-polystyrene diblock copolymer may have the structure represented by Formula 7 or 8, and the polystyrene-polyolefin-polystyrene triblock copolymer may have the structure represented by Formula 12 or 13. Also, the polyolefin-polystyrene diblock copolymer may have a structure in which the units derived from the organozinc compound of Formula 3, that is, B and A defined in Formula 3, are bound to one end of Formula 7 or 8 and the other end of Formula 7 or 8 is terminated with $CH_3$, and the polystyrene-polyolefin-polystyrene triblock copolymer may have the structure represented by the following Formula 14 or 15.

According to one embodiment of the present invention, an amine-based compound, particularly a triamine compound may be used together with the alkyllithium compound in the step (2). The triamine compound may, for example, be N,N,N'',N'',N''-pentamethyldiethylenetriamine (PMDETA). The alkyllithium compound and the amine-based compound may, for example, be used at a molar ratio of 0.5:1 to 1:1. The amine-based compound may serve as an initiator in combination with the alkyllithium compound.

The block copolymer composition according to one embodiment of the present invention may include the first block at an amount of 10% by weight to 99% by weight, and may include the second block and the third block at a combined amount of 1% by weight to 90% by weight, based on the total weight of the composition. Particularly, the block copolymer composition may also include the first block at an amount of 40% by weight to 85% by weight, and may include the second block and the third block at a combined amount of 15% by weight to 60% by weight. More particularly, the block copolymer composition may include the first block at an amount of 60% by weight to 80% by weight, and may include the second block and the third block at a combined amount of 20% by weight to 40% by weight.

Also, one example of the method of preparing a block copolymer composition according to the present invention may further include allowing the product prepared in the step (2) to react with water, oxygen, or an organic acid to convert the product into a block copolymer (step (3)).

The product prepared in the step (2) may be represented by Formula 8, as described above. When water, oxygen, an organic acid, or the like is added to the compound including the block copolymer formed symmetrically about zinc (Zn) as the center of symmetry and prepared in the step (2), a bond between zinc and a block bound to the zinc may be cleaved to form two block copolymers.

Therefore, the block copolymer composition according to one embodiment of the present invention may also have a structure in which a unit derived from a compound used during preparation of the block copolymer composition, particularly a unit derived from the organozinc compound of Formula 3 is included between the third block and the first block. One example of such a structure of the block copolymer is represented by the following Formula 14:

[Formula 14]

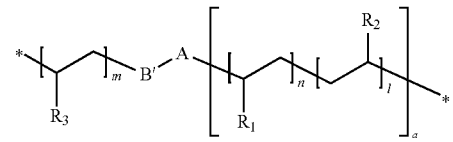

wherein each of $R_1$ to $R_3$, l, m, and n is as defined in Formulas 1, 5, and 7, A is as defined in Formula 3, and B' represents a state in which B defined in Formula 3 is bound to the repeating unit of Formula 9.

Also, another example of the structure of the block copolymer, in which a unit derived from the compound used during preparation of the block copolymer composition, particularly a unit derived from the organozinc compound of Formula 3 is included between the third block and the first block, is represented by the following Formula 15:

[Formula 15]

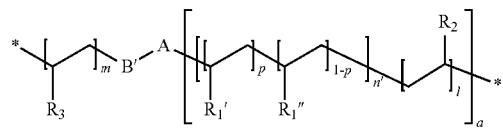

In Formula 15,
wherein each of $R_1'$, $R_1''$, $R_2$ and $R_3$, p, l, m, and n' is as defined in Formulas 2, 6, and 9, A is as defined in Formula 3, and B' represents a state in which B defined in Formula 3 is bound to the repeating unit of Formula 9.

Also, because the method of preparing a block copolymer composition does not use a monomer which may leave a residual unsaturated bond, such as a diene compound (for example, butadiene, isoprene, or the like), during the preparation of the polyolefin-based block, the method does not require a separate hydrogenation reaction for saturating a residual unsaturated bond. Also, the method of the present invention does not have a problem that the unsaturated bonds which are not saturated even by a saturation process of hydrogenating the monomer remain. Therefore, the block copolymer composition of the present invention may not include an unsaturated bond.

Mode for Carrying Out the Invention

EXAMPLES

Hereinafter, Examples of the present invention will be described in further detail so that a person having ordinary skill in the art to which the present invention belongs can easily put the invention into practice. However, it should be understood that the present invention may be embodied in various forms and is not limited to the Examples described herein.

Preparation Example: Preparation of Organozinc Compound

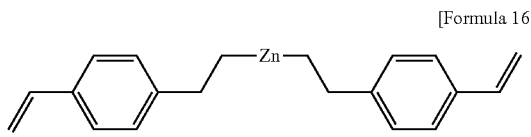

[Formula 16]

Borane dimethyl sulfide (1.6 mL, 3.2 mmol) was slowly added to triethylborane (0.6 g) while stirring, and then reacted for 90 minutes. The resulting reaction mixture was slowly added to divinylbenzene (3.8 g) dissolved in anhydrous diethylether (10 mL) cooled to −20° C., and then stirred overnight. After the solvent was removed using a vacuum pump, diethyl zinc (0.8 g) was added thereto. A reaction was carried out at 0° C. for 5 hours while removing the generated triethylborane through vacuum distillation. Residual divinylbenzene and diethyl zinc were removed by vacuum distillation at 40° C. Methylcyclohexane (150 mL) was added to dissolve the product, and solid compounds generated as by-products were then filtered off through Celite to prepare an organozinc compound represented by Formula 16.

Example 1

15 mL of 1-hexene and 357 μmol of an organozinc compound {(CH$_2$=CHC$_6$H$_4$CH$_2$CH$_2$)$_2$Zn} were dissolved in 100 g of methylcyclohexane, and the resulting mixture was put into a high-pressure reactor, and heated to a temperature of 80° C.

A solution (5 μmol) including a transition metal compound represented by the following Formula 17 and [(C$_{18}$H$_{37}$)N(Me)H]$^+$[B(C$_6$F$_5$)$_4$]$^−$ as a cocatalyst at a ratio of 1:1 was injected into the high-pressure reactor, and ethylene was immediately injected thereinto so that the pressure was maintained at 20 bars.

After a polymerization process was performed at a temperature of 95° C. to 100° C. for 45 minutes, the remaining gas was exhausted. Me$_3$SiCH$_2$Li and N,N,N'',N''',N'''-pentamethyldiethylenetriamine (PMDETA) were mixed at a ratio of 1:1 (420 μmol) in methylcyclohexane, and the resulting mixture was injected into the reactor, and then stirred for 30 minutes. The stirring temperature was maintained at 90° C. to 100° C. 8.5 mL of styrene was injected into the high-pressure reactor, and the mixture was reacted for 5 hours, while maintaining the temperature between 90° C. and 100° C., so as to convert all the styrene monomers. After the styrene was completely converted, acetic acid and ethanol were sequentially injected. The obtained polymer composition was dried overnight at 80° C. in a vacuum oven.

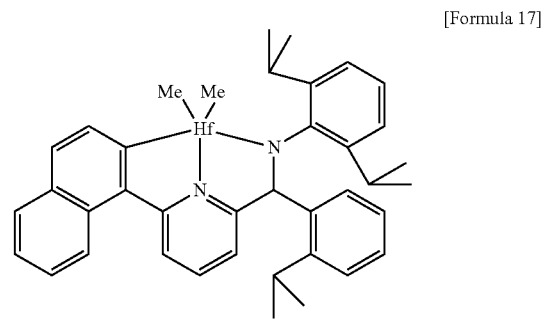

[Formula 17]

Examples 2 to 9

Polymer compositions were prepared in the same manner as in Example 1, except that the amounts of 1-hexene, styrene, and an organozinc compound used were varied as listed in Table 1 below.

TABLE 1

| | | | | | | |
|---|---|---|---|---|---|---|
| | | | | Amounts used | | |
| | | 1-hexene (mL) | Styrene (mL) | Organozinc compound (μmol) | Methylcyclohexane (g) | Transition metal compound/cocatalyst solution (μmol) | Me$_3$SiCH$_2$Li/ PMDETA |
| Example 1 | 15 | 8.5 | 357 | 100 | 5 | 420 |
| Example 2 | 20 | 8.5 | 357 | 100 | 5 | 420 |
| Example 3 | 15 | 8.5 | 179 | 100 | 5 | 420 |
| Example 4 | 20 | 6.5 | 179 | 100 | 5 | 420 |
| Example 5 | 15 | 8.5 | 240 | 100 | 5 | 420 |
| Example 6 | 15 | 8.5 | 300 | 100 | 5 | 420 |
| Example 7 | 30 | 8.5 | 357 | 100 | 5 | 420 |
| Example 8 | 30 | 6.5 | 357 | 100 | 5 | 420 |
| Example 9 | 25 | 6.5 | 357 | 100 | 5 | 420 |

Comparative Examples 1 to 5

G1650, G1651, G1652, G1654, and G1657 (including 30% by weight of a diblock copolymer) (Kraton Corp.) were used as commercially available SEBSs, respectively, in Comparative Examples 1 to 5.

Experimental Example

Physical properties of the block copolymer compositions prepared in Examples 1 to 9 and Comparative Examples 1 to 5 were measured according to the following methods. The results are listed in Table 2 below.

1) Weight Average Molecular Weight ($M_w$, g/Mol), Number Average Molecular Weight ($M_n$, g/Mol), and Polydispersity Index (PDI)

A weight average molecular weight ($M_w$, g/mol) and a number average molecular weight ($M_n$, g/mol) of each of the block copolymer compositions were measured using gel permeation chromatography (GPC), and a polydispersity index (PDI) was calculated by dividing the weight average molecular weight by the number average molecular weight.

Column: PL Olexis
Solvent: trichlorobenzene (TCB)
Flow rate: 1.0 mL/min
Sample concentration: 1.0 mg/mL
Amount of injection: 200 μL
Column temperature: 160° C.
Detector: Agilent High Temperature RI detector
Polystyrene Standard used
Molecular weight calculated via Universal Calibration using the Mark-Houwink equation ($K=40.8\times10^{-5}$, $\alpha=0.7057$)

2) Glass Transition Temperature ($T_g$)

The glass transition temperature ($T_g$) was measured using a dynamic mechanical analyzer (DMA), and a specific measurement method is as follows.

After a polymer sample was pressed to a thickness of 1 mm or less, an external force is periodically applied to the polymer sample using equipment to periodically cause stress. At this moment, a degree of deformation corresponding to the stress may be measured. In this case, the mechanical modulus is determined from the stress and deformation. The shear modulus (G) and the Young's modulus (E) are measured according to the type of applied stress. That is, a phase difference occurs according to the stress that periodically changes due to the time delay caused by the viscoelastic characteristics of a material. The dynamically measured modulus in consideration of this phase difference is explained by G' (storage modulus) and G" (loss modulus). G', which is referred to as the storage modulus and is directly obtained through the DMA measurement, is an in-phase response of a sample with the periodic stress, and corresponds to a degree of reversible elasticity. As a variable component, G", which is referred to as the loss modulus, is a response phase-shifted to 90°, and corresponds to mechanical energy irreversibly lost due to being converted to heat. When an E" value is plotted as a log scale, $T_g$ is the temperature corresponding to the maximum E" value.

3) Melt Index (MI, at 230° C. and a Condition of Loading of 5 kg)

The melt index was measured at 230° C. and a condition of loading of 5 kg according to the ASTM D1238 (ISO 1133) standards, and the weight (g) of a polymer obtained by melting for 10 minutes was checked and measured.

4) Hot Press Condition

As listed in Table 2 below, a specimen having a thickness of 1 mm or less was prepared by pressing a polymer at the corresponding temperature and pressure for a predetermined period of time using a hot press.

5) Content of Diblock Copolymer

A GPC curve obtained using gel permeation chromatography (GPC) was obtained by deconvoluting peaks by assuming two Gaussian curves.

Origin was used as a program for peak deconvolution, and Multiple Peak Fit was used for analysis. Specifically, the peaks on the Gaussian curve were fitted into two peaks on the assumption that the measured molecular weight is the molecular weight of the triblock copolymer and 75% of the measured molecular weight is the molecular weight of the diblock copolymer. The obtained area percentage was calculated as the weight percentage, based on the measured molecular weight.

TABLE 2

| | $M_w$ (g/mol) | PDI | $T_g$ (° C.) | $MI_5$ (g/10 min) | Hot press condition temperature (° C.)/ pressure (bar)/time (min) | Diblock co-polymer content (% by weight) |
|---|---|---|---|---|---|---|
| Example 1 | 74,200 | 1.57 | −40.4 | 1.433 | 140/200/30 | 13.8 |
| Example 2 | 84,500 | 1.53 | −44.0 | 1.577 | 140/200/30 | 11.7 |
| Example 3 | 99,400 | 1.46 | −39.7 | 0.492 | 140/200/30 | 11.8 |
| Example 4 | 98,511 | 1.48 | −54.4 | 1.193 | 140/200/30 | 10.2 |
| Example 5 | 102,700 | 1.66 | −45.4 | 0.387 | 140/200/30 | 14.8 |
| Example 6 | 82,000 | 1.60 | −46.9 | 0.876 | 140/200/30 | 13.2 |
| Example 7 | 78,432 | 1.65 | −51.7 | 0.788 | 140/200/30 | 9.6 |
| Example 8 | 76,702 | 1.62 | −52.5 | 2.072 | 140/200/30 | 13.8 |
| Example 9 | 77,857 | 1.57 | −46.7 | 1.034 | 140/200/30 | 11.5 |
| Comparative Example 1 | 54,569 | 1.08 | −50.7 | 0.2 | 200/200/60 | 0 |
| Comparative Example 2 | 139,261 | 1.13 | — | Not determined | Not processed | 0 |
| Comparative Example 3 | 44,055 | 1.12 | −45.6 | 5.864 | 140/200/30 | 0 |
| Comparative Example 4 | 95,550 | 1.11 | −47.7 | Not determined | Difficult to process | 0 |
| Comparative Example 5 | 64,947 | 1.23 | −55.2 | 21.47 | 140/200/30 | 30 |

Referring to Table 2, it can be seen that the copolymer compositions of Examples 1 to 9 had a weight average molecular weight ($M_w$) of 70,000 g/mol or more, and also had an $MI_5$ value of 0.2 g/10 min or more as well as a high PDI value. In particular, the copolymer compositions of Examples 1 to 9 had a higher high polydispersity index (PDI) value compared to the styrene-ethylene/butylene-styrenes (SEBSs) of Comparative Examples 1 to 5, and thus it is expected that they will exhibit excellent processability. In particular, it was determined that compared to the Comparative Example 5 in which 30% by weight of the diblock copolymer was included to complement low processability of the SEBS, the polymers of Examples 1 to 9 had a higher high PDI value even though the content of the diblock copolymer in the polymers of Examples 1 to 9 was much lower than that of Comparative Example 5, and thus it is expected that the polymers of Examples 1 to 9 will exhibit superior processability. Therefore, it will be possible to avoid the problems of poor mechanical properties such as tensile strength, and the like, which may be degraded with an increasing content of the diblock copolymer. From the results of the experiment conducted under hot press conditions, it was confirmed that it was possible to press the polymers of Examples 1 to 9 at a temperature of 140° C. and a pressure of 200 bars for 30 minutes using a hot press to prepare a specimen having a thickness of 1 mm or less, but the SEBS of Comparative Example 1 had poor processability, and thus required increased temperature, pressure, and time for hot press. The SEBS of Comparative Example 2 could not be processed into a specimen at all, the SEBS of Comparative Example 4 was difficult to process into a specimen using a hot press, and both of the SEBSs of Comparative Examples 2 and 4 had a very low melting property, and the melt indexes of the SEBSs were not measured. On the other hand, the SEBS of Comparative Example 4 was also able to be pressed with difficulty to prepare a small-sized specimen for measurement of glass transition temperature ($T_g$).

Although the SEBSs of Comparative Example 3 and 5 were capable of producing specimens at the same conditions of temperature, pressure, and time for hot press as in the polymer compositions of Examples 1 to 9 to prepare specimens, the SEBSs of Comparative Example 3 and 5 had a high MI value because of the low weight average molecular weight of the SEBS of Comparative Example 3 and the high content of the diblock copolymer in the SEBS of Comparative Example 5. Nevertheless, the SEBSs of Comparative Example 3 and 5 had a lower PDI value, compared to the polymer compositions of Examples 1 to 9.

The invention claimed is:
1. A block copolymer composition, comprising:
a triblock copolymer and a diblock copolymer, wherein the block copolymer composition having:
(1) a weight average molecular weight ($M_w$) of 70,000 g/mol to 120,000 g/mol;
(2) a polydispersity index (PDI) of 1.0 to 2.0;
(3) a glass transition temperature ($T_g$) of −55° C. to −30° C.; and
(4) a melt index (MI), measured at 230° C. and a loading condition of 5 kg, of 0.2 g/10 minutes to 3.0 g/10 minutes,
wherein the triblock copolymer comprises:
a first block comprising one or more repeating units represented by the following Formula 1;
a second block comprising a repeating unit represented by the following Formula 6; and
a third block comprising a repeating unit represented by the following Formula 9:

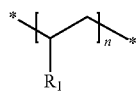

[Formula 1]

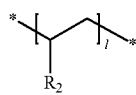

[Formula 6]

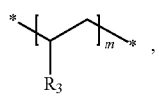

[Formula 9]

and
wherein the block copolymer composition comprises a composite block represented by the following Formula 8, which is formed by binding of the first block comprising the repeating unit of Formula 1 and the second block comprising the repeating unit of Formula 6:

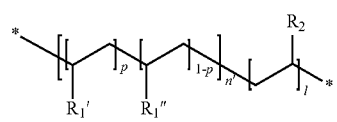

[Formula 8]

wherein $R_1$ is hydrogen, an alkyl having 1 to 20 carbon atoms, an alkyl having 1 to 20 carbon atoms, which is substituted with silyl, an arylalkyl having 7 to 20 carbon atoms, or an arylalkyl having 7 to 20 carbon atoms, which is substituted with silyl, wherein $R_1'$ and $R_1''$ are each independently hydrogen; an alkyl having 1 to 20 carbon atoms, an alkyl having 1 to 20 carbon atoms, which is substituted with silyl, an arylalkyl having 7 to 20 carbon atoms, or an arylalkyl having 7 to 20 carbon atoms, which is substituted with silyl, provided that $R_1'$ and $R_1''$ are different from each other, $R_2$ and $R_3$ are each independently an aryl having 6 to 20 carbon atoms, or an aryl having 6 to 20 carbon atoms, which is substituted with a halogen, an alkyl having 1 to 12 carbon atoms, a cycloalkyl having 3 to 12 carbon atoms, an alkoxy having 1 to 8 carbon atoms, or an aryl having 6 to 12 carbon atoms, $0<p<1$, n is an integer ranging from 10 to 10,000,
n' is an integer ranging from 10 to 10,000, and
l and m are each independently an integer ranging from 10 to 1,000.

2. The block copolymer composition of claim 1, wherein the weight average molecular weight ($M_w$) ranges from 74,000 g/mol to 103,000 g/mol.

3. The block copolymer composition of claim 1, wherein the polydispersity index (PDI) ranges from 1.4 to 1.7.

4. The block copolymer composition of claim 1, wherein the glass transition temperature ($T_g$) ranges from −52° C. to −39° C.

5. The block copolymer composition of claim 1, wherein the melt index ranges from 0.3 g/10 minutes to 2.1 g/10 minutes.

6. The block copolymer composition of claim 1, wherein the triblock copolymer comprises a polystyrene-polyolefin-polystyrene triblock copolymer and wherein the diblock copolymer comprises a polyolefin-polystyrene diblock copolymer.

7. The block copolymer composition of claim 6, wherein the block copolymer composition comprises the diblock copolymer at a content of 19% by weight or less.

8. The block copolymer composition of claim 1, wherein $R_1$ is hydrogen; or an alkyl having 3 to 12 carbon atoms.

9. The block copolymer composition of claim 1, wherein $R_1$ is hydrogen or an alkyl having 4 to 12 carbon atoms, and $R_2$ and $R_3$ are phenyl.

10. A block copolymer composition, comprising:
a triblock copolymer and a diblock copolymer, wherein the block copolymer composition having:
(1) a weight average molecular weight ($M_w$) of 70,000 g/mol to 120,000 g/mol;
(2) a polydispersity index (PDI) of 1.0 to 2.0;
(3) a glass transition temperature ($T_g$) of −55° C. to −30° C.; and (4) a melt index (MI), measured at 230° C. and a loading condition of 5 kg, of 0.2 g/10 minutes to 3.0 g/10 minutes, wherein the triblock copolymer comprises:

a first block comprising one or more repeating units represented by the following Formula 1;

a second block comprising a repeating unit represented by the following Formula 6; and a third block comprising a repeating unit represented by the following Formula 9:

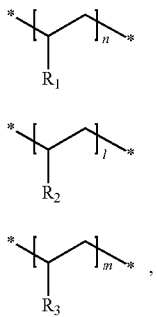

[Formula 1]

[Formula 6]

[Formula 9]

and wherein the block copolymer composition comprises a structure represented by the following Formula 13:

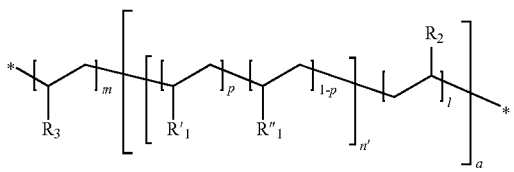

[Formula 13]

wherein $R_1$ is hydrogen, an alkyl having 1 to 20 carbon atoms, an alkyl having 1 to 20 carbon atoms, which is substituted with silyl, an arylalkyl having 7 to 20 carbon atoms, or an arylalkyl having 7 to 20 carbon atoms, which is substituted with silyl, wherein $R_1'$ and $R_1''$ are each independently hydrogen, an alkyl having 1 to 20 carbon atoms, an alkyl having 1 to 20 carbon atoms, which is substituted with silyl, an arylalkyl having 7 to 20 carbon atoms, or an arylalkyl having 7 to 20 carbon atoms, which is substituted with silyl, provided that $R_1'$ and $R_1''$ are different from each other, and $R_2$ and $R_3$ are each independently an aryl having 6 to 20 carbon atoms, or an aryl having 6 to 20 carbon atoms, which is substituted with a halogen, an alkyl having 1 to 12 carbon atoms, a cycloalkyl having 3 to 12 carbon atoms, an alkoxy having 1 to 8 carbon atoms, or an aryl having 6 to 12 carbon atoms, $0 < p < 1$, n is an integer ranging from 10 to 10,000, n' is an integer ranging from 10 to 10,000, l and m are each independently an integer ranging from 10 to 1,000, and a is an integer ranging from 1 to 50.

11. The block copolymer composition of claim 1, wherein the first block is present in an amount of 10% by weight to 99% by weight, and wherein the second and third blocks are present in a total amount of 1% by weight to 90% by weight, based on the total weight of the block copolymer composition.

12. The block copolymer composition of claim 10, wherein the weight average molecular weight ($M_w$) ranges from 74,000 g/mol to 103,000 g/mol.

13. The block copolymer composition of claim 10, wherein the polydispersity index (PDI) ranges from 1.4 to 1.7.

14. The block copolymer composition of claim 10, wherein the glass transition temperature ($T_g$) ranges from −52° C. to −39° C.

15. The block copolymer composition of claim 10, wherein the melt index ranges from 0.3 g/10 minutes to 2.1 g/10 minutes.

16. The block copolymer composition of claim 10, wherein the triblock copolymer comprises a polystyrene-polyolefin-polystyrene triblock copolymer and wherein the diblock copolymer comprises a polyolefin-polystyrene diblock copolymer.

17. The block copolymer composition of claim 16, wherein the block copolymer composition comprises the diblock copolymer at a content of 19% by weight or less.

18. The block copolymer composition of claim 10, wherein the first block is present in an amount of 10% by weight to 99% by weight, and wherein the second and third blocks are present in a total amount of 1% by weight to 90% by weight, based on the total weight of the block copolymer composition.

* * * * *